United States Patent [19]

Amano et al.

[11] Patent Number: 4,766,730
[45] Date of Patent: Aug. 30, 1988

[54] GAS EJECTING SYSTEM FOR MAIN CONDENSER IN GEOTHERMAL STEAM TURBINE PLANT

[75] Inventors: Masayuki Amano, Yokohama; Seiji Okawa; Yoshio Nakano, both of Tokyo, all of Japan

[73] Assignee: Kabushiki Kaisha Toshiba, Kawasaki, Japan

[21] Appl. No.: 24,038

[22] Filed: Mar. 10, 1987

[30] Foreign Application Priority Data

Mar. 10, 1986 [JP] Japan .................................. 61-50301

[51] Int. Cl.⁴ ............................................... F03G 7/04
[52] U.S. Cl. ..................................... 60/641.5; 60/685; 60/689; 60/693
[58] Field of Search .................. 60/641.2, 641.3, 641.4, 60/641.5, 685, 688, 689, 692, 693

[56] References Cited

U.S. PATENT DOCUMENTS 4,363,215 12/1982 Sharp .................................. 60/641.2

FOREIGN PATENT DOCUMENTS 32442 3/1977 Japan .................................. 60/641.2

OTHER PUBLICATIONS

"Zensekai Tinetsu Hatsuden Kaihatsu Yohran", published by Japanese Company, Kabushiki Kaisha Fuji Technosystem, Aug. 15, 1981.

"Basic Planning of Geothermal Steam Turbine Plant", published by Kabushiki Kaisha Toshiba in Mar. 1983.

*Primary Examiner*—Stephen F. Husar
*Attorney, Agent, or Firm*—Oblon, Fisher, Spivak, McClelland & Maier

[57] ABSTRACT

A geothermal steam turbine plant comprises a steam turbine operatively connected to a production well, an indirect-contact type main condenser into which a geothermal steam including non-condensed gas is introduced from the steam turbine, and a cooling water supply system for supplying cooling water to the main condenser. The non-condensed gas contained in the geothermal steam is ejected by a gas ejecting system comprising a geothermal steam jet ejector connected to the main condenser, a direct-contact type condensing system connected to the steam jet ejector for condensing the geothermal steam into the geothermal water including substantially no non-condensed gas by directly contacting the steam to the condensate from the main condenser, a pipe line for returning the condensed water from the condensing system to the main condenser, and a condensate water pipe line for circulating the condensate water pooled in the main condenser to the condensing system so as to be independently located from the cooling water system. The condensate water pipe line is branched from a condensate water pump assembled in a pipe line extending outwardly from the bottom of the main condenser.

8 Claims, 3 Drawing Sheets

GAS EJECTING SYSTEM FOR MAIN CONDENSER IN GEOTHERMAL STEAM TURBINE PLANT

BACKGROUND OF THE INVENTION

This invention relates to a geothermal steam turbine plant and particularly to a gas ejecting system therefor for ejecting non-condensed gas from a main condenser.

A condenser for use in a goethermal steam turbine plant is generally classified into the direct-contact type and the indirect-contact type.

In the direct-contact type condenser, in which condensate water directly contacts cooling water, cooling water is sprayed and exhausted geothermal steam from a steam tubine is directly contacted with the sprayed cooling water to condense the steam thereby to obtain the condensate water. This is a so-called cooling system specific for the geothermal steam turbine plant which does not require the separation of the steam and the cooling water.

On the other hand, in the indirect-contact type condenser condensate water does not directly contact cooling water and in which cooling water circulates in heat exchanging tubes located in the condenser and the indirect heat exchanging process is performed between the cooling water and turbine exhaust steam through the heat exchanging tubes thereby to condense the steam.

Conventional geothermal steam turbine plants respectively utilizing the direct—and indirect—contact type condensers will be explained hereunder with reference to schematic diagrams shown in FIGS. 2 and 3.

Referring to FIG. 2 which shows the conventional geothermal steam turbine plant employing a direct-contact type condenser, reference numerals 1 and 2 designate a direct-contact type main condenser and a steam turbine, respectively. The geothermal steam supplied from a production well (W) through a main steam pipe 3 is fed to the steam turbine 2 to perform its function of driving a generator (not shown) therein and is exhausted into the main condenser 1. Within the main condenser 1, cooling water from a cooling water tower or vessel 4 is sprayed through a water distributor from a spray pipe 5 which is provided with a plurality of nozzles. The steam exhausted from the steam turbine 2 is contacted to the cooling water and then condensed into condensate, which is pooled at the bottom of the condenser 1.

The condensate pooled in the condenser 1 is then fed to the cooling water tower 4 by the operation of a condensate water pump 6 assembled in a pipe line extending outwardly from the bottom of the main condenser 1. The condensate in the cooling water tower 4 is cooled in direct contact to the atmosphere and then pooled in a water tank located at the bottom of the cooling water tower 4. In the illustrated example, the cooling water pooled in the water tank of the cooling water tower is vacuumed by means of the substantial vacuum condition in the main condenser 1 thereinto through the water distributor 5 and again used as cooling water in the main condenser 1.

Since non-condensed gases contained in the geothermal steam except for ones dissolved in the condensate are accummulated in the main condenser 1, the removal of the accummulated gases will be required. A mechanical extractor, for example a gas compressor, steam ejector or the like, is generally used as means for removing the non-condensed gases, and the example illustrated in FIG. 2 utilizes the steam jet ejector. Namely, the geothermal steam from the main steam pipe 3 is fed into first and second stage steam jet ejectors 7 and 8, respectively, whereby the non-condensed gases in the condenser 1 are sucked by the ejecting effect, and exhausted into the atmosphere.

Mixed fluid consisting of the non-condensed gasses and the steam exhausted from the first stage steam ejector 7 is fed to an inter condenser 9, in which the mixed fluid is cooled by the cooling water sprayed from a water distributor as a spray pipe 10 thereby to condense only the steam. As the cooling water for this use is used in the water sucked up through an auxiliary cooling water line from the water tank of the cooling water tower 4 by means of an auxiliary cooling water pump 11.

The goethermal water condensed in the inter condenser 9 is returned into the condenser 1 through a drain return pipe line 12. The non-condensed gases are sucked into the second stage steam jet ejector 8, in which the pressure of the gases are raised, together with operating steam, over the atmospheric pressure, and the gases are then fed into an after condenser 13, in which the cooling water fed through the auxiliary cooling water line from the auxiliary cooling water pump 11 is sprayed through a water distributor as a spray pipe 14. The steam is cooled and condensed by the cooling water sprayed through the water distributor 14, and the condensate water is then returned to the main condenser 1 through a drain return pipe line 15. The non-condensed gases in the after condenser 13 have a gas pressure, for example 1.05–1.1 ata, higher than the atmospheric pressure, so that the gases are exhausted into the atmosphere through an exhaust pipe 16 due to the pressure difference therebetween.

In the main condenser gas ejecting system having the structure described hereinabove, since the cooling air and the condensate fed by means of the condensate pump 6 are directly contacted in the cooling tower, the condensed water is evaporated into the air or removed by air as water drops. On the other hand, however, since the geothermal steam fed into the steam turbine 2, the inter condenser 9 and the after condenser 1 13 is condensed into condensate and then fed into the cooling system as cooling water, the cooling water in the whole system tends to increase. For this reason, the cooling water over the predetermined level in the water tank of the cooling water tower 4 is discharged outside the system through an over-flow pipe 17.

FIG. 3 shows an example of a system utilizing an indirect-contact type main condenser, in which reference numeral 1A designates an indirect-contact type main condenser which is provided with a number of condenser tubes 18, so that the production cost of the indirect contact type main condenser of the type 1A is high in comparison with that of the direct-contact type condenser as shown in FIG. 2. Because of this fact, in a geothermal steam turbine plant, the direct-contact type condenser is generally used.

In a case, however, where the direct-contact type main condenser is utilized, as described with reference to the example shown in FIG. 2, a portion of the geothermal steam is evaporated or mixed with the air to be dispersed into the atmosphere through the cooling water tower 4, and in another view point, the excessive geothermal water pooled in the water tank of the cooling water tower 4 is caused to overflow and discharged outside the system through an overflow pipe. The geothermal steam or water may sometimes contain various impurities some of which contain a harmful hydrogen sulphide ($H_2S$), and in such cases, the disposal of such harmful substances should be controlled or prescribed by law. Accordingly, in a case where there is a possibility for the disposal of the geothermal steam including harmful substances, it will be necessary to separate the system for processing the cooling water from the system for processing the geothermal steam in use of the indirect-contact type main condenser.

When the indirect-contact type main condenser 1A shown in FIG. 3 is utilized, an inter condenser 9A and an after condenser 13A are also constructed as indirect-contact type system, the condenser 1A, the inter condenser 9A and the after condenser 13A are provided with cooling tubes 18, 19 and 20, respectively, and the cooling water tower 4 is supplied by the operation of the cooling water circulation pump 21 into the main condenser 1A, the inter condenser 9A and the after condenser 13A through a circulating cooling water line. The heat exchanging operation between the cooling water and the steam is performed during the passing of the cooling water through the cooling tubes 18, 19 and 20, respectively, and after the heat exchanging process, the cooling water again returns to the cooling water tower 4, in which the water is cooled by air and again pooled in the water tank to reuse the same as the cooling water to be fed through the circulating cooling water line by means of the circulation pump 21.

As described hereinabove, in the system including the indirect-contact type main condenser 1A, since the cooling water circulation system constitutes an independent closed circulation cycle, the geothermal steam or water is never introduced into the cooling water. Due to this constructional fact, the cooling water can be completely separated from the geothermal water in use of fresh water such as river water or sea water. In this case, although a portion of the cooling water is of course discharged into the atmosphere with the air from the cooling water tower 4, the mixed air includes no harmful substance, thus providing no environmental problem.

An additional water supply pipe 17 is connected to the cooling water tower 4 for supplementing the cooling water evaporated or dispersed into the atmosphere, but all the geothermal water condensed in the inter condenser 9A and the after condenser 13A is returned to the main condenser 1A and mixed with the condensate from the steam turbine 2. The thus condensed and mixed geothermal water is then discharged into a reinjection well externally connected to the condensate pipe line 22 including the condensate water pump 6 to prevent the environmental pollution. It should be noted that equipments or members, shown in FIG. 3, designated by the same reference numerals as those of the first example shown in FIG. 2 are not explained in a repeated manner.

As described above, in the conventional systems, when the direct-contact type main condenser 1 is utilized, the inter condenser 9 and the after condenser 13 are also constructed as direct-contact types, and on the other hand, when the indirect-contact type main condenser 1A is utilized, the inter condenser 9A and the after condenser 13A are also constructed as indirect-contact types. In a case where the indirect-contact type system is utilized, the inter condenser 9A and the after condenser 13A are very enlarged, which results in higher production cost, since, relatively low heat exchanging efficiency will be attained. Namely, in the indirect-contact type system, the heat exchanging operation is performed between the mixed fluid, in the inter condenser 9A and the after condenser 13A, consisting of the steam and the non-condensed gasses and the cooling water passing through the cooling water tubes. However, because of the existence of the non-condensed gas, the heat exchanging efficiency is lowered, and for this reason, it is required to use cooling tubes having a surface area larger than that of tubes to be used for heat-exchanging and condensing only the steam. It is accordingly required to use an increased number of the cooling tubes, which results in the enlargement of the heat exchanging equipment, thus being not economical.

In the meantime, when the inter condenser 9 and the after condenser 13 of the direct-contact type are incorporated in the system utilizing the indirect-contact type condenser 1A, the geothermal water is mixed with the cooling water of fresh water in both condensers 9A and 13A. In this case, in order to avoid discharging the geothermal water outside the system, it is necessary to return the mixed condensate into the main condenser 1A and it should be discharged into the reinjection well. This, however, means that the cooling fresh water is continuously lost together with the geothermal water, which results in the defect that a fresh water amount to be supplemented into the cooling water tower 4 should be increased.

SUMMARY OF THE INVENTION

An object of this invention is to eliminate defects encountered in the conventional art of this technical field and to provide a compact gas ejecting system for a geothermal steam turbine plant containing an indirect-contact type main condenser and direct-contact type inter and after condensers for condensing the geothermal steam thereby to enhancing the heat exchanging effect.

Another object of this invention is to provide a plurality of direct-contact type condensing devices connected to gas ejecting devices, respectively, to improve the gas ejecting efficiency.

A further object of this invention is to provide a condensate water supply pipe line system connecting the main condenser and the condensing devices independently of a cooling water supply pipe line system for supplying the cooling water to the main condenser.

These and other objects can be achieved, according to this invention, by providing a gas ejecting system for a geothermal steam turbine plant of the type comprising a steam turbine operatively connected to a production well, an indirect-contact type main condenser into which geothermal steam including non-condensed gas is introduced from the steam turbine, and a cooling water supplying system for supplying the cooling water to the main condenser, the gas ejecting system comprising steam ejector means connected to a main condenser at an inlet side thereof for ejecting the non-condensed gas from the main condenser; condensing means connected to the steam ejector means at the outlet side thereof for condensing the geothermal steam into a geothermal water; first connecting means for connecting the condensing means to the main condenser for returning the geothermal water in the condensing means; and second connecting means for connecting the main condenser to the condensing means for circulating a condensate pooled in the main condenser to the condensing means, the second connecting means being located independently of the cooling water pipe line system.

In a preferred embodiment, the condensing system is of the direct-contact type in which the geothermal steam is directly contacted to the condensate from the main condenser through the condensate water pipe line, which is branched from a condensate water pump assembled in a pipe line extending outwardly from the bottom of the main condenser.

DESCRIPTION OF THE PREFERRED EMBODIMENT

Figure 1:
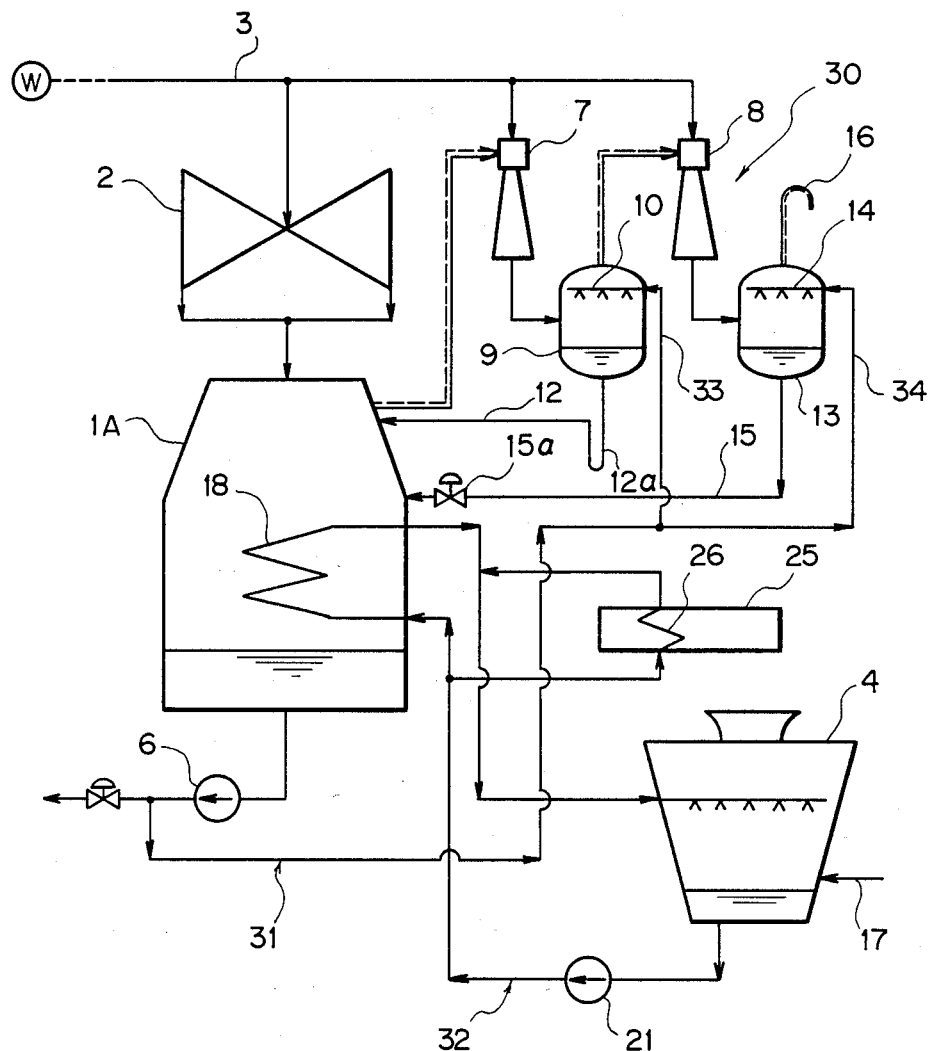
FIG. 1 is a schematic diagram of a gas ejecting system in a geothermal steam turbine plant according to this invention.
Figure 2:
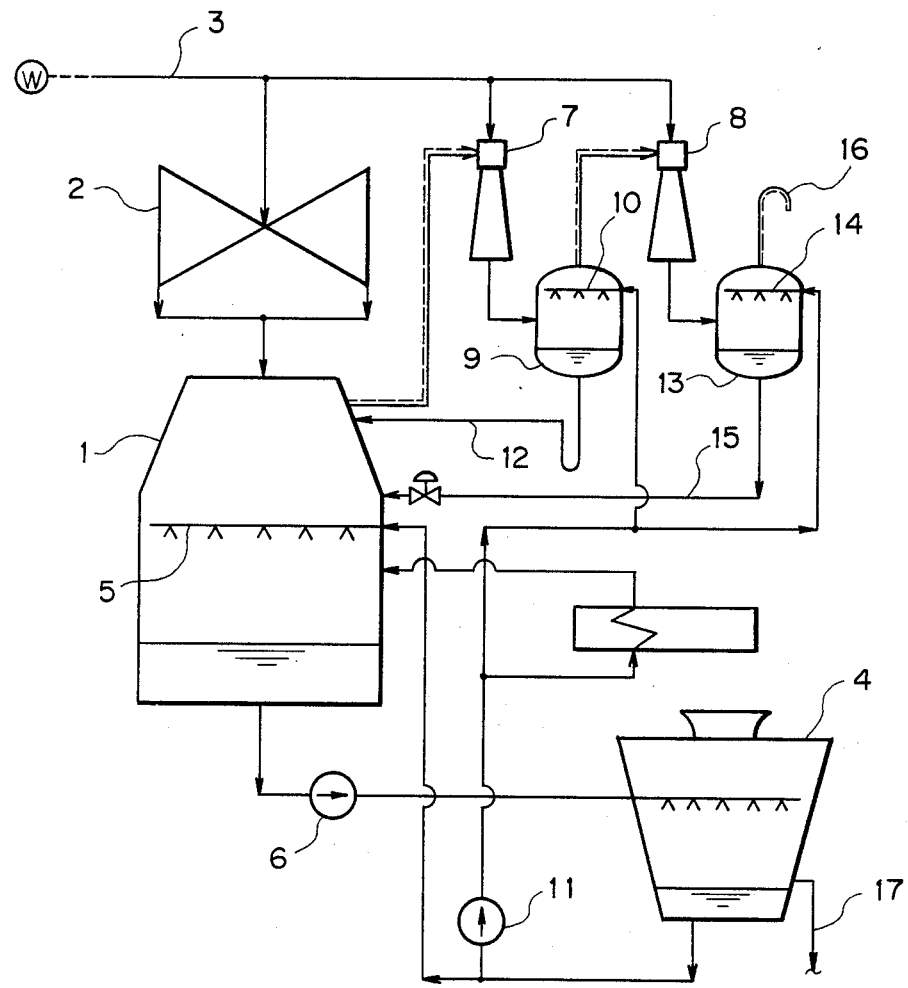
FIG. 2 is a schematic diagram of a conventional gas ejecting system in a geothermal steam turbine plant in which a direct-contact type main condenser is utilized.
Figure 3:
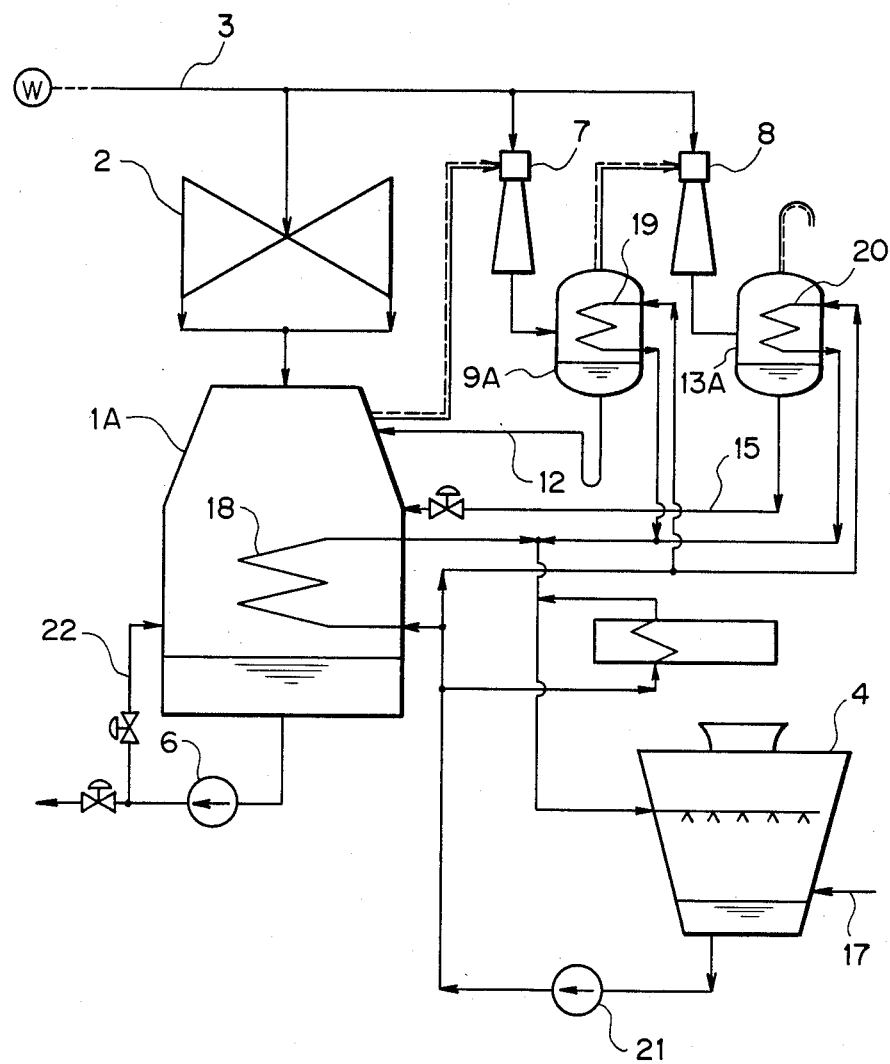
FIG. 3 is also a schematic diagram of a conventional one similar to that of FIG. 2 in which an indirect-contact type main condenser is utilized.

FIG. 1 shows an embodiment of the geothermal steam turbine plant of 20,000 KW-125,000 KW including a gas ejecting system for a condenser according to this invention, in which the same reference numerals are used to denote the same equipments or members as those of the conventional plants explained in connection with FIGS. 2 and 3 and the detailed explanations of these equipments or members are omitted hereunder.

Referring to FIG. 1, reference numeral 1A designates an indirect-contact type main condenser and reference numeral 2 designates a geothermal steam turbine. A gas ejecting system 30 for sucking non-condensed gases in the main condenser 1A and ejecting them outside the turbine plant comprises a mechanical extractor, for example first and second stage steam jet ejectors 7 and 8 as mechanical extractor means, and an inter condenser 9 and an after condenser 13 as condensing means which are connected to the outlet sides of the ejectors 7 and 8, respectively. The first and the second stage steam jet ejectors 7 and 8 are illustrated singly respectively in the drawing. Actually, however, they are installed respectively in plurality, and one of them is used as a spare, respectively. The condensers 9 and 13 have multi-stage constructions (two-stage type shown in FIG. 1) of the direct-contact type. Water distributors 10 and 14 of spray pipe type are also located in the respective condensers 9 and 13.

A condensate water pipe line system 31 is branched from the discharge side of a condensate water pump 6 assembled in a pipe line extending externally from the bottom of the main condenser for feeding the condensate from the indirect-contact type main condenser 1A and the condensate pipe line system 31 is connected at the other end to the water distributors 10 and 14 located in the condensers 9 and 13. The condensate fed from the main condenser 1A to the pipe line system 31 is distributed or sprayed in the inter condenser 9 and the after condenser 13 as first connecting means through the water distributors 10 and 14 for cooling purposes.

The condensate water pipe line system 31 as second connecting means for cooling the inter and after condensers is constituted independently of the cooling water pipe line system 32 which cools the interior of the main condenser 1A, so that the mixing of the geothermal water and the cooling water can be surely prevented.

The operation of the geothermal steam turbine plant including the gas ejecting system for the main condenser according to this invention will be described hereinbelow.

The cooling water cooled in the cooling water tower 4 circulates in a circulating cooling water line 32 to cool the main condenser 1A and cooling tubes 26 for various kinds of auxiliary coolers 25. The water which has cooled the main condenser 1A and the auxiliary coolers 25 returns to the cooling water tower 4. The auxiliary coolers are, for example, generator air coolers, oil coolers, etc.

The non-condensed gases in the main condenser 1A are sucked by the first and second stage steam jet ejectors 7 and 8 in accordance with the ejecting effect thereof and the removed gases are finally exhausted into the atmosphere through the inter condenser 9, the after condenser 13 and the gas exhaust pipe 16 connected to the latter condenser 13.

In the meantime, the geothermal water is respectively fed to the water distributors 10 and 14 of the inter condenser 9 and the after condenser 13, as cooling water, through cooling water supply pipes 33 and 34 of the condensate water pipe line system 31 branched from the discharge side of the condensate pump 6. The geothermal water is then sprayed into the interior of the inter and after condensers 9 and 13 through the water distributors 10 and 14. In accordance with these processes, the steam at the outlet of the first and second steam ejectors 7 and 8 is cooled and condensed, and the geothermal water after thus cooled is returned to the main condenser 1A through the drain return pipe lines 12 and 15. A U-seal 12a is disposed at a position in the drain return pipe line 12. The U-seal 12a prevents the steam in the inter condenser 9 from draining into the main condenser 1A. The main condenser 1A has an internal pressure of e.g. 2–4 inch Hg, and the inter condenser 9 has an internal pressure of e.g. 0.3–0.4 ata (about 9 inch Hg). The pressure difference between the two causes the geothermal water to return to the main condenser 1A.

The internal pressure of the after condenser 13 is re-adjusted to be e.g. 1.05–1.1 ata by adjusting the opening of the second steam jet ejector 8. The water level of the after condenser 13 is constantly kept at a certain level by a level controller detecting a level of the geothermal water condensate in the after condenser 13 and adjusting the opening of a control valve 15a.

The geothermal water returned to the condenser 1A is cooled by the cooling water passing through the condenser tube 18 and the thus cooled water is mixed with the condensate of the discharged gasses from the steam turbine 2. The geothermal water is thus divided into two parts; one being returned to the re-injection well and the other, as cooling water, circulating to the inter condenser 9 and the after condenser 13.

As described hereinbefore, according to this invention, the condensers are constituted as the direct-contact type by using the separate circulating systems for the cooling water and the geothermal water in spite of the use of the indirect-contact type main condenser, so that extremely compact condensers can be utilized in comparison with the use of the indirect-contact type condensers thereby to maintain the high heat exchanging efficiency, which will result in lower cost for the whole system. In addition, since the cooling water amount to be supplied into the condenser through the condensate pipe line system is generally greater than the minimum flow amount of the condensate pump, the condensate pipe line can be commonly used with the minimum flow pipe of the condensate pump by branching the condensate pipe line from the discharge side of the condensate pump towards the respective condensers, thus eliminating the location of the minimum flow regulating valve and the control means for the regulating valve which have to be used in the conventional system.

What is claimed is:

1. A system for ejecting gas from a main condenser located in a geothermal steam turbine plant including a steam turbine operatively connected to a production well, an indirect-contact type main condenser into which a geothermal steam including non-condensed gas is introduced from said steam turbine, and means for supplying cooling water to said main condenser through a cooling water pipe line system, comprising:

steam ejector means connected to said main condenser at an inlet side thereof for ejecting the non-condensed gas from said main condenser;

condensing means connected to said steam ejector means at the outlet side thereof for condensing the geothermal steam into a geothermal water;

first connecting means for connecting said condensing means to said main condenser for returning the geothermal water in said condensing means; and second condensing means for connecting said main condenser to said condensing means for circulating a condensate pooled in said main condenser to said condensing means, said second connecting means being independent of said cooling water pipe line system.

2. The gas ejecting system according to claim 1, wherein said condensing means is of a direct-contact type in which the geothermal steam from said ejecting means is directly contacted to the condensate as a cooling water from said main condenser through said second connecting means.

3. The gas ejecting system according to claim 1, wherein said second connecting means is a condensate water pipe line system branched from a condensate water pump assembled in a condensate pipe line extending externally from the bottom of said main condenser.

4. The gas ejecting system according to claim 1, wherein said condensing means comprises at least two direct-contact type condensers, one being an inter condenser and the other being an after condenser and said second connecting means extending from said main condenser is operatively connected to said inter and after condensers, respectively.

5. The gas ejecting system according to claim 4, wherein said ejecting means comprises at least two stage steam jet ejectors located on the inlet sides of said inter and after condensers, respectively.

6. The gas ejecting system according to claim 1, wherein said cooling water pipe line circulates through an interior of said main condenser to attain a heat exchanging effect between the geothermal water from said condensing means and said cooling water pipe line through an indirect contact therebetween.

7. The gas ejecting system according to claim 2, wherein said condensing means comprises at least two direct-contact type condensers, one being an inter condenser and the other being an after condenser and said second connecting means extending from said main condenser is operatively connected to said inter and after condensers, respectively.

8. The gas ejecting system according to claim 7, wherein said cooling water pipe line circulates through an interior of said main condenser to attain a heat exchanging effect between the geothermal water from said condensing means and said cooling water pipe line through an indirect contact therebetween.

* * * * *